United States Patent [19]

Zeliger et al.

[11] Patent Number: 5,019,441

[45] Date of Patent: May 28, 1991

[54] METHOD OF RESTORING AND CONSERVING OIL PAINTINGS AND RESULTING INTEGRATED PERMANENT STRUCTURE

[75] Inventors: Harold I. Zeliger, 18 Spring Hill Ter., Spring Valley, N.Y. 10977; Frank J. Nussbaum, Point Lookout, N.Y.

[73] Assignee: Harold I. Zeliger

[21] Appl. No.: 326,019

[22] Filed: Mar. 20, 1989

[51] Int. Cl.[5] .......................... B32B 35/00; B32B 3/00

[52] U.S. Cl. .................................... 428/196; 428/225; 427/140; 427/290; 156/153; 156/94

[58] Field of Search .................. 156/94, 153; 428/196, 428/225; 427/140, 290

[56] References Cited

U.S. PATENT DOCUMENTS

| | | | |
|---|---|---|---|
| 2,073,802 | 3/1937 | Oliver | 427/316 X |
| 3,924,026 | 12/1975 | Penfield | 156/230 X |
| 4,305,773 | 12/1981 | Hendricks | 156/94 X |
| 4,330,586 | 5/1982 | Fieux | 428/196 |

*Primary Examiner*—George F. Lesmes
*Assistant Examiner*—Terrel Morris
*Attorney, Agent, or Firm*—Kenyon & Kenyon

[57] ABSTRACT

A process for integrating and permanently conserving an oil painting on canvas first eliminates stresses in the paint film induced by the original canvas by breaking down the weave of the canvas through physical abrasion or other means for severing the loops without damaging the paint film. The stress relieving step is followed by integrating the paint film, the original ground layer, remnants of old canvas, and a new dimensionally stable backing layer of material having an estimated life comparable to the expected life of the paint film. Integration is accomplished by means of a liquid coherant that cures to a permanent flexible material that provides a continuous bond between the paint film and the new backing layer. The coherant has a life expectancy comparable to that of the backing layer, with no deleterious physical or chemical effects on the paint film.

15 Claims, 1 Drawing Sheet

METHOD OF RESTORING AND CONSERVING OIL PAINTINGS AND RESULTING INTEGRATED PERMANENT STRUCTURE

BACKGROUND OF THE INVENTION

1. Field of the Invention.

The present invention relates to the art of restoring and conserving oil paintings on canvas, and particularly to the art of integrating a restored painting with a suitable backing.

2. Description of the Related Art.

Oil paintings on canvas have only a limited time period before they start to disintegrate. Although the paint film may endure for centuries, the canvas undergoes continuous and fairly rapid chemical and physical decomposition. Consequently, restoration is often required within decades.

Conventionally, painting restorers laminate a new canvas backing over the deteriorated canvas in a process called lining. After a period of time, the second canvas deteriorates and must be replaced (relining). This repeated process dictates the use of a reversible adhesive, since the previously laminated canvas backing must be removed before applying a new canvas backing. Restorers traditionally use hot melt adhesives for the lining and relining processes, for these adhesives lend themselves to easy removal. Historically, beeswax has been the hot melt adhesive used, but in recent years some restorers have tried synthetic hot melt adhesives. Because it is recognized that heating can damage the paint film, some restoration has been performed using pressure sensitive adhesives at normal room temperatures.

Instead of canvas, it has been proposed in U.S. Pat. No. 4,330,586 of FIEUX to use a flexible substrate layer of fine mesh synthetic material, such as a woven polyester monofilament, fiberglass, or a polyester mylar. The substrate may be fixed to the rear face of the original canvas of an oil painting by a silicone pressure sensitive transfer adhesive applied at room temperature. Alternatively, FIEUX suggests a heat activated adhesive, such as ethylene vinyl acetate or a wax resin. The substrate can be used alone, or it can be backed with a canvas or poplin lining.

It is well recognized that any work done on a painting damages it. The lining and relining processes expose the painting to physical and chemical damages. Hot melt adhesives thermally damage the paint film, both when applied and when subsequently removed. Adhesives that require solvents for removal inflict chemical damage to the paint film. Water based adhesives cause the canvas to contract and expand, thus stressing the paint film.

The deterioration of the original canvas is the most damaging of all to the paint film. As the canvas decomposes, it loses its original function, that of supporting the paint film. This causes the film to crack and ultimately to separate from the canvas. Contractions and dimensional changes in the original canvas introduce stresses in the paint film that further weaken it. The application of a second canvas backing and filling of voids with adhesives or waxes does not alleviate the stresses induced by the dimensional changes in the original canvas. The added lining simply provides a temporary treatment to the painting. As long as the original canvas is intact, it will continue to deteriorate and the paint film will continue to lose its support. The deteriorated canvas will continue to stress the paint film. Over time, many works of art are lost long before the paint film deteriorates, due to the instability of the canvas. Even the use of synthetic materials for lining and relining does not appreciably help the situation, since the deterioration of the original canvas continues to introduce stresses in the paint film.

SUMMARY OF THE INVENTION

The present invention provides a process, and a product of the process, that makes it possible to produce an integrated structure to restore and permanently preserve an aged oil painting on canvas. The process involves first eliminating the stresses in the paint film caused by the deterioration of the old canvas and assuring that no additional stresses will be subsequently introduced by further deterioration of the old canvas. This objective is accomplished by abrading or otherwise breaking down the canvas weave. The paint film, ground layer, and old canvas remnants are then integrated with a new non-canvas support into a single composite structure by means of a coherant. A coherant is a term coined by the applicant to denote a material capable of penetrating through the remnants of old canvas, filling the voids on the back of the paint film, and forming a continuous bond to the paint film; likewise capable of filling any voids in the new support and forming a continuous bond with the new support; and not significantly oxidizing or otherwise deteriorating during the expected lifetime of the paint film when exposed to normal atmospheric conditions.

In particular, the invention includes a process for integrating and conserving an oil painting on canvas, the painting including a layer of oil paint having an exposed face surface, a ground layer, and a layer of woven canvas having an exposed back surface, the paint layer being attached to the canvas layer, wherein the process comprises:

a) removing at least a portion of the back surface of the canvas layer sufficient to break the weave such as to eliminate any stress introduced by the canvas layer in the paint layer;

b) providing a dimensionally stable new backing of a material having a life expectancy comparable to the expected life of the paint in the paint layer, the backing having a front face and a back face;

c) applying a uniform coating of a liquid coherant to at least one of the back of the painting and the front face of the new backing, the liquid coherant being capable of penetrating the remaining canvas layer and ground layer and of curing at ambient temperature to a form having a life expectancy comparable to the life expectancy of the new backing material and of securely bonding, in the cured form, to the paint layer and to the new backing material without any deleterious effect on the paint layer; and d) compressing the painting and the new backing together by applying uniform pressure to the face surface of the paint layer and to the rear face of the backing until the coherant has cured.

In a preferred embodiment of the process, step a) comprises abrading the exposed back surface of the canvas layer to a depth at which all loops of the weave have been severed.

A preferred material for the new backing comprises a synthetic polymeric fabric or a synthetic polymeric film that does not oxidize upon exposure to normal atmospheric conditions. This synthetic polymer may be selected from the group consisting of nylon, polyester, acrylic, polyethylene, polypropylene, polyvinyl fluoride, polyurethane, fiberglass, and composite materials. The liquid coherant preferably is selected from the group consisting of polyvinyl acetate emulsions, acrylic solutions, acrylic emulsions, ethylene vinyl acetate solutions, ethylene vinyl acetate emulsions, silicones, polyurethanes, polyamides and epoxies. The coherant preferably is capable of drying or curing at ambient or room temperatures.

In a further preferred embodiment of the process, step d) comprises:

placing the new backing, front face up, on a rigid support having at least a top layer that is porous;

placing the painting, face surface up, on the new backing after applying the coating of liquid coherant;

enclosing the support and painting inside a flexible airtight bag and sealing the bag;

evacuating the interior of the bag so as to apply a uniform pressure on the face surface of the painting and the back surface of the backing; and releasing the vacuum after the coherant has cured.

The invention also provides a composite restored painting structure including successively a layer of paint having an exposed face surface; an intermediate ground layer; an original layer of woven canvas having a front surface and a back surface, the paint layer being applied to the intermediate ground layer on the front surface of the original canvas layer; and a new backing layer having a front face and a rear face, wherein the improvement comprises:

at least a portion of the back of the original canvas has been removed to a depth sufficient to break the loops of the weave;

the new backing layer comprises a dimensionally stable material having a life expectancy comparable to the expected life of the paint in the paint layer; and a layer of a permanently flexible coherant is disposed between the paint layer and the dimensionally stable material, the coherant filling all voids in the back surface of the paint layer and ground layer, in the remainder of the original canvas layer, and in the front face of the new backing layer; securely bonding to the paint layer and the new backing layer; and having a life expectancy comparable to that of the new backing layer, with no deleterious effects on the paint layer.

The composite structure of the invention is devoid of stresses imposed by the original canvas layer and is composed of materials that will last the lifetime of the paint layer without needing subsequent relining.

BRIEF DESCRIPTION OF THE DRAWINGS

The features and advantages of the invention will be understood more clearly from the following detailed description, taken in conjunction with the accompanying drawings, in which.

DETAILED DESCRIPTION OF THE PREFERRED EMBODIMENTS

Figure 1:
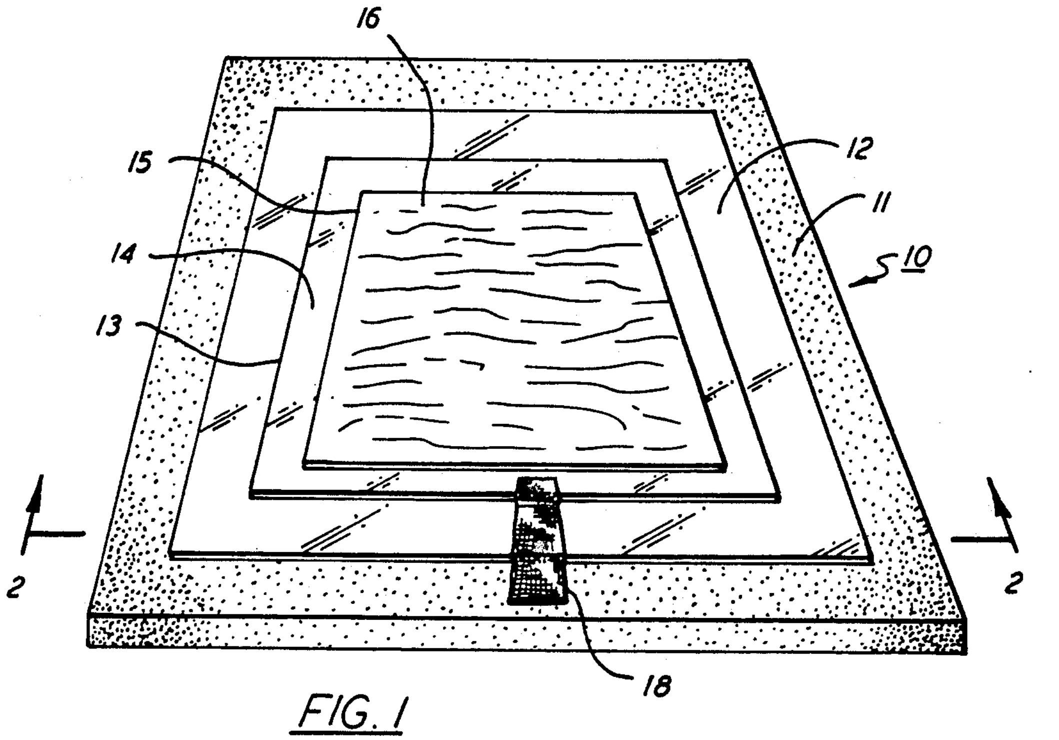
FIG. 1 is perspective view, partially cut away, of apparatus for performing the process of the invention.

In the following description, the same reference numerals are used to identify the same elements in the several figures.

As explained above, the principal features of the restoring and conserving process of the present invention are the effective destruction of the original canvas of an oil painting so as to eliminate stresses induced in the paint film, followed by integrating the paint film with a new backing material that has a life span equal to that of the paint by means of a coherant that produces no deleterious physical or chemical effects on the paint film. The destruction or elimination of the original canvas is accomplished preferably by placing the painting face down on a flat support and then manually or mechanically abrading the rear surface of the canvas with sandpaper or some suitable instrument. Since the purpose is to eliminate the cause of induced stresses in the paint film, it is not necessary to completely remove the canvas material but only to break the loops of the weave. In this way there are enough canvas remnants left attached to the paint film to avoid damaging the film and to retain the coherency of the painting. If the paint film itself is cracked, flaking, or otherwise damaged, it may be desirable to attach one or more layers of tissue paper to the face of the painting with a water-soluble glue or other facing adhesive before starting work on the back of the painting. This is a common technique used by restorers to prevent further damage to the paint film during the restoration process. After the process is completed, the tissue paper can be removed after softening the glue with water.

The grit of sandpaper to use depends on the type and condition of the canvas. It can be determined easily by a skilled restorer through experimentation. The skilled artisan also may prefer to use suitable small power sanders, clippers, or grinders in the initial stages, instead of manual sanding, to facilitate the process.

After the weave loops are gone, the painting is ready for integration with a new backing. The integrating process requires the application of uniform pressure while the originally liquid coherant cures to a flexible solid form. The means preferred for applying such pressure are a rigid porous support panel for the painting, a flexible airtight envelope for enclosing the panel and the painting, and a vacuum source for evacuating the envelope that is capable of uniformly providing a negative pressure of between 0.2 and 30 inches. The vacuum system is capable of continually removing entrapped air and vapors produced by the drying or curing of the coherant.

Figure 2:
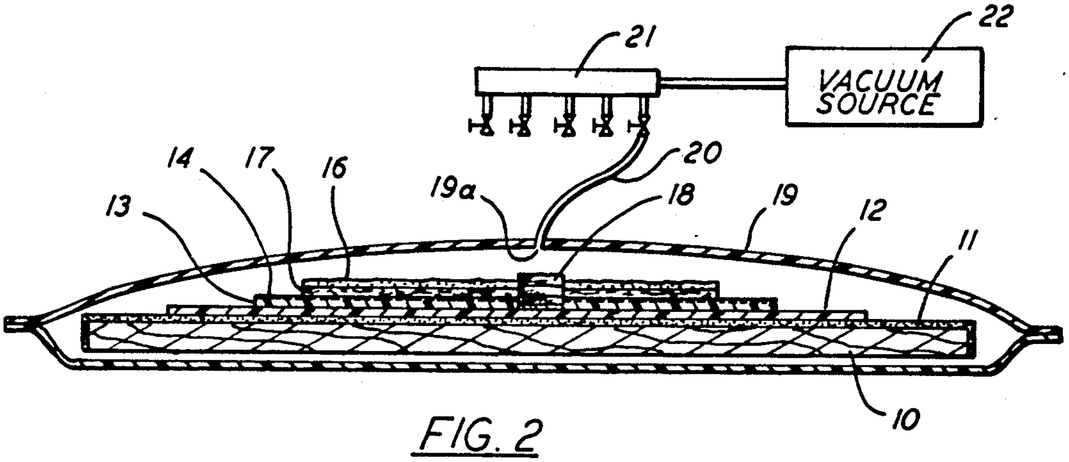
FIG. 2 is an elevation view in cross section of the apparatus of FIG. 1.

As shown in FIGS. 1 and 2, a rigid support panel 10 has a porous surface 11. The panel may be made of wood or any other suitable rigid material and may be covered with a woven or nonwoven fabric that provides the porous surface 11. Alternatively, the panel itself may be made of a material that is sufficiently porous to allow gases to pass through it continuously when a vacuum is applied to the interior of the sealed envelope with the panel inside.

A guard sheet 12 of flat smooth material is placed on the porous surface of the rigid support, the guard sheet being smaller than the support 10 but larger than the painting to be treated. This piece of flat smooth material may be plastic or fibrous.

A new backing sheet or layer 13, smaller than the guard sheet is then placed on the guard sheet. As described previously, the new backing layer is composed of a material that is dimensionally stable and will not oxidize upon exposure to normal atmospheric conditions. A preferred material for the new backing comprises a synthetic polymeric fabric or a synthetic polymeric film. This synthetic polymer may be selected from the group consisting of nylon, polyester, acrylic, polyethylene, polypropylene, polyvinyl fluoride, polyurethane, fiberglass, and composite materials.

An even coating 14 of a liquid coherant such as a polyvinyl acetate emulsion, an acrylic solution or emulsion, an ethylene vinyl acetate solution or emulsion, a silicone, a polyurethane, or an epoxy is applied to the exposed face of the new backing layer. The liquid coherent should fill any voids in the new backing sheet 13 and be curable at normal room temperature to a permanently flexible solid capable of forming a continuous permanent bond with the material of the sheet.

The painting 15, composed of a paint film 16 on a ground layer 17*a* (FIG. 3) and remnants of original canvas 17, is next placed face up on the coated new backing, with the previously abraded surface of the original canvas of the painting contacting the liquid coherant. The liquid coherant should also be capable of penetrating through the remnants of old canvas and ground layer to fill any voids on the back of the paint film and to form, after curing, a continuous bond to the paint film. If desired, the abraded rear surface of the painting can be coated with liquid coherant instead of, or in addition to, coating the new backing, before the painting is placed on the backing.

A small strip 18 of porous material, such as canvas, is placed on the exposed surfaces of the support 10, the guard sheet 12, and the new backing layer 13, as shown in FIG. 1. This strip provides a porous bridge over the guard strip between the porous surface of the support and the new backing in cases where the guard sheet is not made of a porous material. It is important that the strip not touch the painting, however, to avoid any damage to the paint film during the compression step.

The entire structure of FIG. 1 is then placed inside an envelope or bag 19 (FIG. 2) made of clear polyethylene or other smooth, soft, and flexible airtight material. All edges of the bag are sealed, either by heat or with tape. The bag has a single hole 19*a*, preferably about one-quarter inch in diameter, located over the bridging strip 18. A tube 20 connects the interior of the bag via a manifold 21 to a vacuum source 22. A vacuum is drawn continuously until the coherant is cured. Depending on the composition of the coherant, this will take between a few minutes and several hours. The manifold permits several paintings to be vacuum treated simultaneously at negative pressures of 0.2–30 inches.

The soft material of the envelope applies uniform pressure on the face of the painting during the period that the envelope is evacuated, even if the painting has different textures or an impasto surface, as is often the case. At the same time the porous bridge 18 and the porous surface 11 of the rigid support panel provide a path for any air pockets or vapors emanating from the drying or curing coherant that otherwise might be trapped behind the painting. This assures even support for the painting during the curing period so that the final integrated structure will be perfectly flat and with no internal stresses in the paint film.

Figure 3:
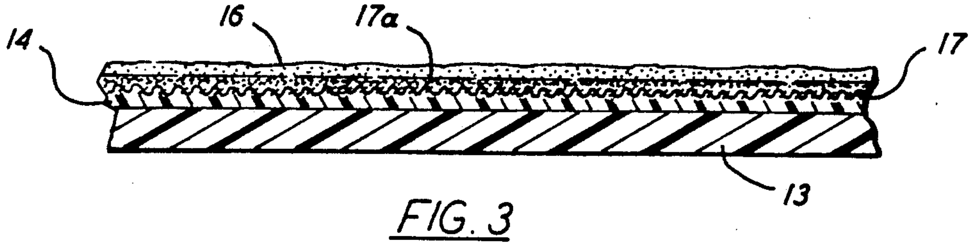
FIG. 3 is an elevation view in cross section, at an enlarged scale, of a composite restored oil painting structure according to the invention.

After curing is completed, the vacuum is released, the envelope opened, and the integrated painting structure removed. As shown in FIG. 3, this integrated structure comprises the paint film 16 secured to the new backing 13 by a coherant that penetrates and surrounds the remnants 17 of the original canvas and fills any and all voids in the back of the paint film and in the front face of the new backing to provide a complete and continuous bond between the paint film and the backing.

Although the above-described apparatus is the preferred means for applying uniform pressure to the painting structure during the curing period, other known means, such as electrostatic pressure apparatus, can be used if desired.

We claim:

1. A process for integrating and conserving an oil painting on canvas, the painting including a layer of oil paint having an exposed face surface, a ground layer, and a layer of woven canvas having an exposed back surface, the paint layer being attached to the ground layer on the canvas layer, wherein the comprises:

a) removing at least the port of the back surface of the canvas layer bearing paint sufficient to break the weave so as to eliminate any stress introduced by the canvas layer in the paint layer;

b) providing a dimensionally stable new backing of a material having a life expectancy comparable to the expected life of the paint in the paint layer, the backing having a front face and a back face;

c) applying a uniform coating of a liquid coherant to at least one of the back of the painting and the front face of the new backing, the liquid coherant being capable of penetrating the remaining canvas layer and ground layer and of curing to a form having a life expectancy comparable to the life expectancy of the new backing material and of securely bonding, in the cured form, to the paint layer and to the new backing material without any deleterious effect on the paint layer; and d) compressing and integrating the painting and the new backing together by applying uniform pressure to the face surface of the paint layer and to the rear face of the backing until the coherant has cured.

2. The process of claim 1 wherein step a) comprises abrading the exposed back surface of the canvas layer to a depth at which all loops of the weave have been severed.

3. The process of claim 1 wherein the new backing comprises a synthetic polymeric fabric that does not oxidize upon exposure to normal atmospheric conditions.

4. The process of claim 3 wherein the synthetic polymer is selected from the group consisting of nylon, polyester, acrylic, polyethylene, polypropylene, polyvinyl fluoride, polyurethane, fiberglass, and composite materials.

5. The process of claim 1 wherein the new backing comprises a synthetic polymeric film that does not oxidize upon exposure to normal atmospheric conditions.

6. The process of claim 5 wherein the synthetic polymer is selected from the group consisting of nylon, polyester, acrylic, polyethylene, polypropylene, polyvinyl fluoride, polyurethane, fiberglass, and composite materials.

7. The process of claim 1 wherein the liquid coherant is selected from the group consisting of polyvinyl acetate emulsions, acrylic solutions, acrylic emulsions, ethylene vinyl acetate solutions, ethylene vinyl acetate emulsions, silicones, polyurethanes, and epoxies.

8. The process of claim 1 wherein step d) comprises:

placing the new backing, front face up, on a rigid support having at least a top layer that is porous;

placing the painting, face surface up, on the new backing after applying the coating of liquid coherant;

enclosing the support and painting inside a flexible airtight bag and sealing the bag;

evacuating the interior of the bag so as to apply a uniform pressure on the face surface of the painting and the back surface of the backing; and releasing the vacuum after the coherant has cured.

9. The process of claim 1 wherein all steps are carried out at ambient temperatures.

10. In a composite restored painting structure including successively a layer of paint having an exposed face surface; an original layer of woven canvas having a front surface and a back surface, the paint layer being applied to the front surface of the original canvas layer; and a new backing layer having a front face and a rear face, the improvement wherein:

at least the portion of the back of the original canvas bearing paint removed to a depth sufficient to break the loops of the weave;

the new backing layer comprises a dimensionally stable material having a life expectancy comparable to the expected life of the paint in the paint layer; and a layer of a permanently flexible coherant is disposed between the paint layer and the dimensionally stable material, the coherant filling all voids in the back surface of the paint layer, in the remainder of the original canvas layer and ground layer, and in the front face of the new backing layer; securely bonding to the paint layer and the new backing layer; and having a life expectancy comparable to that of the new backing layer, with no deleterious effects on the paint layer.

11. The structure of claim 10 wherein the new backing comprises a synthetic polymeric fabric that does not oxidize upon exposure to normal atmospheric conditions.

12. The structure of claim 11 wherein the synthetic polymer is selected from the group consisting of nylon, polyester, acrylic, polyethylene, polypropylene, polyvinyl fluoride, polyurethane, fiberglass, and composite materials.

13. The structure of claim 10 wherein the new backing comprises a synthetic polymeric film that does not oxidize upon exposure to normal atmospheric conditions.

14. The structure of claim 13 wherein the synthetic polymer is selected from the group consisting of nylon, polyester, acrylic, polyethylene, polypropylene, polyvinyl fluoride, polyurethane, fiberglass, and composite materials.

15. The structure of claim 10 wherein the liquid coherant is selected from the group consisting of polyvinyl acetate emulsions, acrylic solutions, acrylic emulsions, ethylene vinyl acetate solutions, ethylene vinyl acetate emulsions, silicones, polyurethanes, and epoxies.

* * * * *